United States Patent [19]
Andre De La Porte et al.

[11] Patent Number: 5,164,241
[45] Date of Patent: Nov. 17, 1992

[54] TRANSPORT BELT

[75] Inventors: Gilles Andre De La Porte, Rozendaal; Peter Van Der Vleuten, Pe Gemert, both of Netherlands

[73] Assignee: Parabeam Industrie-en Handelsonderneming B.V., Al Helmond, Netherlands

[21] Appl. No.: 573,000

[22] PCT Filed: Jan. 18, 1990

[86] PCT No.: PCT/EP90/00097
§ 371 Date: Nov. 19, 1990
§ 102(e) Date: Nov. 19, 1990

[87] PCT Pub. No.: WO90/08214
PCT Pub. Date: Jul. 26, 1990

[30] Foreign Application Priority Data
Jan. 21, 1989 [DE] Fed. Rep. of Germany .... 8900626.7

[51] Int. Cl.⁵ .............................................. B32B 3/02
[52] U.S. Cl. ...................................... 428/97; 198/847; 428/92; 428/95; 428/116; 428/246; 428/250; 428/257; 428/258; 474/261; 474/271
[58] Field of Search .................. 428/91, 95, 97, 116, 428/245, 246, 250, 257, 258, 92; 198/847; 474/261, 271

[56] References Cited
U.S. PATENT DOCUMENTS 3,574,022  4/1971  Lampert ................................ 156/88
4,411,947  10/1983  Heynhold ........................... 428/250
4,896,765  1/1990  Loose ................................... 198/847

FOREIGN PATENT DOCUMENTS
403884  11/1909  France .

Primary Examiner—James J. Bell
Attorney, Agent, or Firm—Cushman, Darby & Cushman

[57] ABSTRACT

The invention relates to a transport belt consisting of a fabric-reinforced plastic sheet material having a textile reinforcing layer which extend in the longitudinal direction and is formed from interlaced warp and weft threads. To obtain good overall strength together with a simple structure of the transport belt, it is provided that the reinforcing layer is formed by a strength component in the form of a double pile cloth comprising an upper and a lower fabric which are held together by low, weft-binding pile threads in such a way as to form a tension-resistant unit of upper and lower fabric in which the pile threads, in the event of a bending stress on the transport belt, permit a small degree of recoverable flexibility between the upper and the lower fabric in the warp direction.

12 Claims, 3 Drawing Sheets

TRANSPORT BELT

FIELD OF THE INVENTION

The invention relates to a transport belt consisting of a fabric-reinforced plastic sheet material having textile reinforcing layers which extend in the longitudinal direction and are formed from interlaced warp and weft threads.

BACKGROUND OF THE INVENTION

Such transport belts are known for the conveyance of articles in a multiplicity of areas. Depending on the nature of the articles to be transported, for example luggage in airports, groceries at supermarket checkouts, bulk materials in mining, etc., these conveyor belts must meet different requirements. What is required in the longitudinal direction is, on account of the generally fairly long conveying distances, a minimum of extensibility combined with a degree of flexibility to allow guidance along a drive and deflecting drum In the transverse direction, flat-running conveyor belts should be very stiff The properties of the transport belt in respect of tensile strength, extensibility and transverse stiffness are essentially determined by the textile layers which act as load-bearing and strength components The incorporation of a plurality of layers of flat fabrics is an attempt to achieve the desired strength together with a long life However, as the number of fabric layers increases, the thickness of the transport belt also increases, which has an adverse effect on the drive system. The various fabric layers tend to slip relative to one another, as a result of which a stretching of the material is unavoidable Similarly, the embedding of the fabric layers presents problems in respect of the necessary attachment by impregnation with a plastic or rubber. EP-A-0,280,118 therefore proposes using, for the weaving of the textile fabric, threads which are already covered as a whole or in part by a layer of rubber or a rubberlike material, to improve the attachment of the cover layers to the embedded layer. If pretreated threads are used, the manufacture of such transport belts is costly. In addition, only the attachment of the load-bearing and strength component is changed and not its property profile for the transport belt. It is still necessary to incorporate a plurality of textile layers.

To obtain the desired overall strength, flat-running conveyor belts are also manufactured using high-tenacity yarns for the textile layers. They confer on the fabric low extensibility and high breaking strength in the longitudinal and transverse directions, but require the use of expensive yarns. However, the transverse stiffness of these conveyor belts, if flat fabrics are incorporated in one or two layers, is still insufficient, so that heavier articles cause the conveyor belt to trough in the middle. This is a disadvantage, for example in respect of processing and packaging stations arranged along the transport path. In addition, the unquiet running and the associated noise does not meet the requirements of an environment-friendly conveyance of articles.

EP-A-0,051,750, finally, discloses a conveyor belt which contains as the only strength component spaced-apart steel wires which extend in the longitudinal direction in a parallel arrangement. In addition, the upper and/or lower cover layer contain an air-filled hollow body as a cushioning layer in order that the impact energy of piece goods may be absorbed. The cushioning layer is formed by a double cloth composed of two parallel lengths of fabric which are kept spaced apart by pile threads distributed over the entire area and which are sealed off to the outside along the side edges over the entire length of the belt. It is true that such a cushioning layer in the form of a compound fabric makes it possible to enclose a volume of air, but it cannot absorb any tensile forces. On the contrary, owing to the flexibility of the spaced-apart double cloth, it is necessary to incorporate a separate strong reinforcing layer. In particular, the transverse stiffness remains inadequate, despite the reinforcing layer, which is a disadvantage for flat-running transport belts.

SUMMARY OF THE INVENTION

It is therefore an object of the invention to provide a transport belt according to the preamble of claim 1 which, to ensure reliable conveyance of articles, possesses a high level of overall strength while having a simple structure.

This object is achieved according to the characterizing part of claim 1 when the reinforcing layer is formed by a strength component in the form of a double pile cloth formed from an upper and a lower fabric which are bound together by low, weft-binding pile threads in such a way as to form a tension-resistant unit of upper and lower fabric, wherein the pile threads, in the event of a flexural stress on the transport belt, permit a small degree of recoverable mobility between the upper and the lower fabric in the warp direction.

This provides a transport belt which, by the incorporation of three-dimensional, stable cloth as sole reinforcing layer, confers a constant length on the transport belt together with a high degree of stiffness and impact resistance, while a remaining degree of flexibility in the longitudinal direction ensures the deflectibility of the conveyor belt. The double pile cloth layer used is capable of absorbing high tensile forces, the pile threads holding the two layers of fabric reliably together, so that the result is an efficient strength component. The two layers of fabric making up the double pile cloth can be bound together one on top of the other or friction-closed. Depending on the length of the pile threads between 0.1 and 2 mm, the layers of the double pile fabric can assume a fixed or guided position in which the pile surfaces develop a restoring force. The physical properties of the transport belt such as temperature, fatigue, weather and ageing resistance, imperviousness to the action of chemicals, low flammability, nature of combustion gases, etc. can be adapted through the choice of raw materials for the yarn of the warp, weft and pile threads to the particular requirements of the intended use and are no longer predetermined by the need to use high-tenacity yarns.

The stiffness in the transverse direction can be additionally improved by using monofilaments as weft threads, while the use of multifilaments as warp threads improves the flexibility in the longitudinal direction.

The so-called crimp effect arising on deflection of a transport belt, and its concomitant tensile and compressive stresses, is dissipated by the three-dimensional cloth. In particular, a staggered arrangement of adjacent pile threads makes it possible to deflect the acting forces.

Usable yarns are in particular yarns made of synthetic fibers, such as polyamide fibers, acrylic fibers, polyester fibers, polyvinyl chloride fibers, etc. Polyamide fibers are alkali-, seawater- and fouling-resistant and have a high breaking strength and abrasive resistance. Owing to their high elasticity, however, they have hitherto only been used as weft threads for trough-forming transport belts. More heat-resistant than polyamide fibers, acrylic fibers have hitherto hardly been used owing to their lack of strength. Polyester fibers have as their most remarkable attributes a very high melting point, excellent recovery, low extensibility and low moisture regain and also good weather resistance. Polyvinyl chloride fibers, having a high chlorine content, are nonflammable, nonignitable and even suffocate fires and hence are suitable in particular for use in below-ground mining. It is also possible to use fiber blends, for example blends of polyester and cotton or blends of polyamide and viscose staple. Similarly, it is possible to use high-tenacity fibers, for example aramid.

The transport belt is in general an endless transport belt which is guided with its backing side over at least one guide and deflection roller and also along support rollers. To improve the quietness of running, this transport belt backing side can be formed by a pile surface of a plush fabric web which can have been attached to the backing side with the pile surface pointing outward and with its direction extending in the longitudinal direction.

To prevent electrostatic charge buildup, this pile surface can be provided with electrically conductive tufts or be formed at least to some extent from tufts composed of conductive yarns.

It is also possible for a plurality of double pile cloth layers to be present in an arrangement in which they are adjacent but spaced-apart and extend in the longitudinal direction and in which these double pile cloths in addition alternate with flat fabric layers or be enclosed by the latter on the outside and the inside.

Further embodiments of the invention will be apparent from the subclaims and the description which follows.

BRIEF DESCRIPTION OF THE DRAWINGS

The invention will now be explained in more detail with reference to the illustrative embodiments depicted in the accompanying drawings, where.

DETAILED DESCRIPTION

The details of the various embodiments of a transport belt 1 depicted in the Figures concern a so-called endless slide belt which runs flat even over long conveying distances. Depending on the intended use, the width of the belt is between 1 and 300 cm, so that it is also possible to manufacture flat drive belts from this material.

Figure 1:
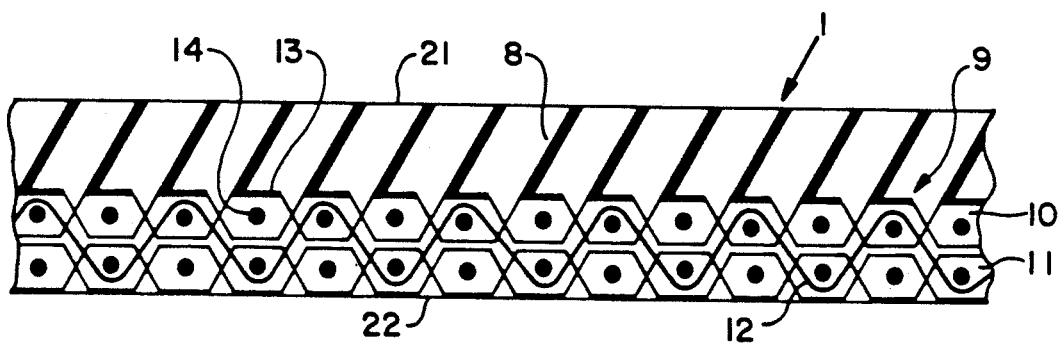
FIG. 1 shows in part a longitudinal section of a first embodiment of the transport belt.

According to FIG. 1, a first embodiment of transport belt 1 consists of a plastic sheet material 8 which forms an upper cover layer and to which is adhesively bonded as strength component a single reinforcing layer in the form of a fabric layer 9. The upper surface of the plastic sheet material 8 is the load-carrying side 21 of transport belt 1, while the lower surface of fabric layer 9 forms the backing side 22 of transport belt 1.

Fabric layer 9 consists of a three-dimensional, undivided double pile cloth comprising an upper fabric 10 and a lower fabric 11 and also, interchanging between the upper and the lower fabric, low pile threads 12. The pile threads 12 bind and hold the upper and the lower fabrics 10 and 11 close together. This form of attachment between the two fabric layers is a bond with a small degree of slidability in the warp direction of the upper and the lower fabrics under a flexing stress. The tractive elements are longitudinal and transverse thread systems (warp and weft threads) which, held in place by the pile thread system, are intermeshed to form a unit. In addition, the pile threads 12 can act as stress deflectors. Preferably, the pile threads 12 are made so low that the upper fabric 10 and the lower fabric 11 come to rest against each other without any distance in between. Otherwise the length of the pile threads 12 is 0.1 to 2 mm between two binding points.

The upper and the lower fabric 10 and 11 are each formed by plain-woven warp threads 13 and weft threads 14. The pile threads 12 are laid in by a 2 V weft pile binding. Depending on the desired thickness of the pile threads 12 between the upper and the lower fabric 10 and 11, the pile threads 12 can also be laid in by a 2/4 V or 3/6 W weft pile binding. In the direction of the weft threads 14, adjacent pile threads 12 can each with the same weft thread 14 or with different weft threads 14, the latter alternative producing a more uniform dispersion of incident forces. The number of pile threads is between 5 and 20 per cm of width. The fabric layer 9 extends with its warp threads 10 in the longitudinal direction of the transport belt 1, while the weft threads 14 extend in the transverse direction of transport belt 1. If, as depicted in FIG. 1, the plastic sheet material 8 is provided only on the load-carrying side 21, so that the lower fabric 11 forms the backing side of the transport belt 1 on a drive or deflection roller, the use of conductive yarns for the lower fabric 11 makes it possible to counteract electrostatic charge buildups.

The yarns used are multifilaments yarns which ensure flexibility in the longitudinal direction. To obtain high stiffness in the transverse direction, the weft threads 14 are preferably formed by monofilaments. The yarn count is within the range between 10 and 600 tex, preferably 100–180 tex.

The fiber material used is polyester. Other synthetic fibers, for example polyamide, polypropylene, etc., and fiber blends can also be used. The same is true of high-tenacity fibers, for example aramid.

The plastic sheet material 8 consists of an elastomeric plastic, preferably rubber or PVC. To ensure a strong bond between fabric and plastic, it is possible to use known rubberizing and coating methods.

Figure 2:
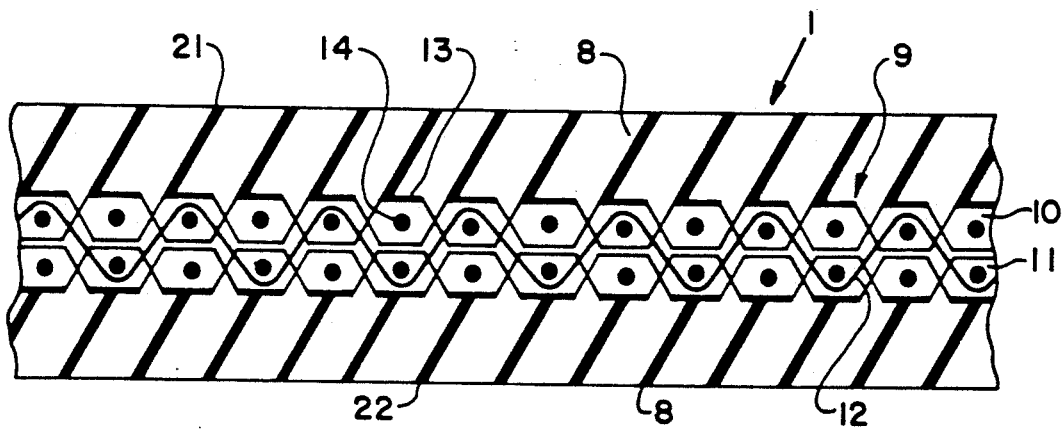
FIG. 2 shows in part a longitudinal section of a second embodiment of the transport belt.

FIG. 2 shows a second embodiment of transport belt 1, again with only one reinforcing layer in the form of a fabric layer 9 which in this case, however, has been arranged in the middle between an upper and a lower cover layer of the plastic sheet material 8.

The top and bottom layers of the plastic sheet material 8 can have different thicknesses. The result is that the position of the fabric layer 9 shifts toward the load-carrying side 21 or to the backing side 22 of transport belt 1. Otherwise the structure of transport belt 1 corresponds to that of the above-described first embodiment.

Figure 3:
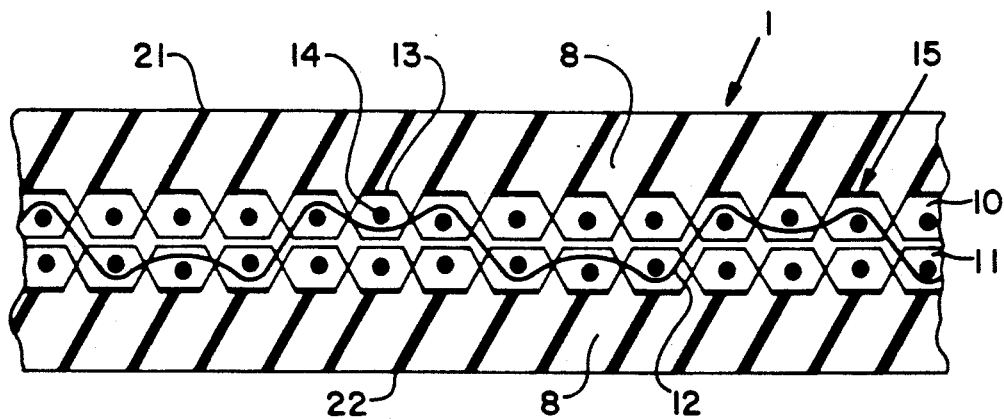
FIG. 3 shows in part a longitudinal section of a third embodiment of the transport belt.

FIG. 3 shows a third embodiment of transport belt 1 having a fabric layer 15 which equals that of the above-described second embodiment except for the binding of the pile threads 12. This is because here the pile threads 12 are laid in by means of a 3/6 W weft pile binding. The pile threads 12, depending on the desired thickness, can likewise join together the upper and the lower fabrics 10 and 11 with a 3/8 W, 4/8 W weft pile binding.

Figure 4:
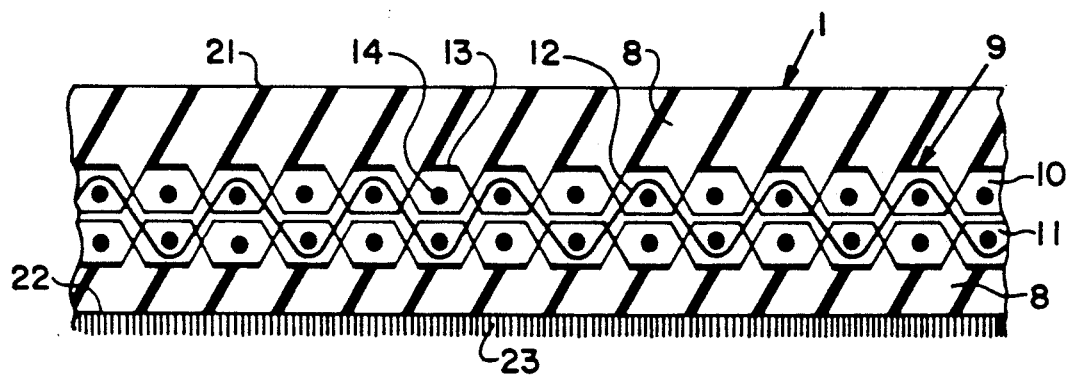
FIG. 4 shows in part a longitudinal section of a fourth embodiment of the transport belt.

FIG. 4 shows a fourth embodiment of transport belt 1 which differs from the second.

The embodiment as per FIG. 2 in that the backing side, i.e. the inner surface, of transport belt 1 features a velour fabric 23. This velour fabric 23 possesses a pile surface which points in the outward direction and on which the transport belt 1 runs on drive or deflection rollers. This pile surface ensures very quiet running. By using conductive yarns for this velour fabric 23 it is also possible to avoid any electrostatic charge buildup on the transport belt 1.

Figure 5:
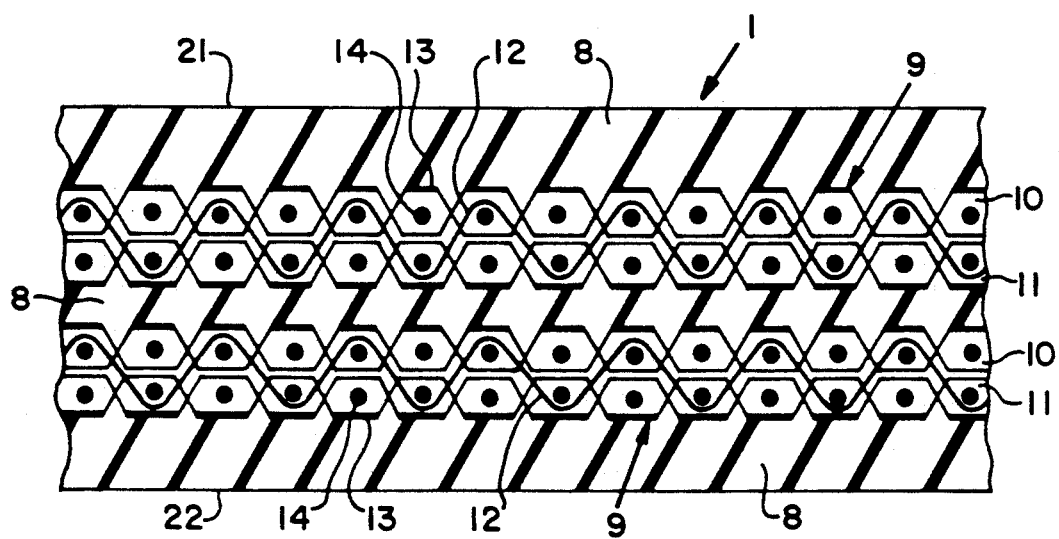
FIG. 5 shows in part a longitudinal section of a fifth embodiment of the transport belt.

FIG. 5 shows a fifth embodiment of transport belt 1 having a reinforcing layer consisting of two adjacent but spaced-apart fabric layers 9. These two fabric layers 9 extend in the longitudinal direction of transport belt 1 and have the same structure as that described in FIGS. 1, 2 and 3. The adjacent lengths of fabric layers 9 can furthermore be combined in such a way that fabric layers having different forms of attachment, lengths and densities of pile threads 12 may alternate. Furthermore, the plastic sheet material 8 consists of an upper cover layer, a lower cover layer and a middle cover layer. In respect of the structure of fabric layer 9 and of plastic sheet material 8, reference is made to the foregoing illustrative embodiments.

Figure 6:
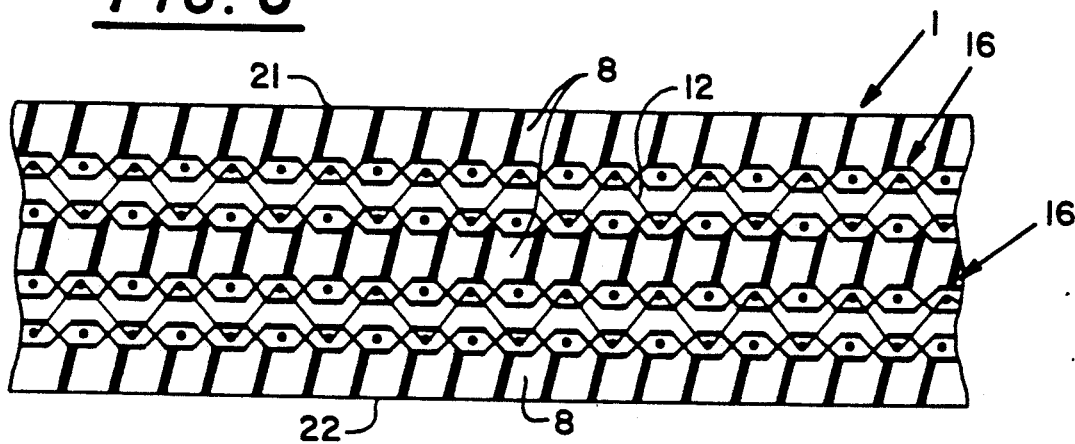
FIG. 6 shows in part a longitudinal section of a sixth embodiment of the transport belt.

FIG. 6 shows a sixth embodiment of transport belt 1 likewise having a reinforcing layer comprising two adjacent but spaced-apart fabric layers 16. The sixth embodiment of transport belt 1 differs from the fifth embodiment of transport belt 1 as per FIG. 5 in that the fabric layer 16 pile threads 12 are arranged with a height of about 1 to 1.5 mm between the upper and the lower fabrics 10 and 11. This arrangement of the upper fabric 10 and the lower fabric 11 likewise ensures a positionally invariant interaction together with efficient elimination of the crimp effect due to different bending stresses on upper fabric 10 and lower fabric 11 at the deflection points of the transport belt 1. The pile threads 12 act on the arrangement of upper and lower fabrics 10 and 11 in the manner of a restoring force. Preferably, the pile threads 12 here leave little space between the upper fabric 10 and the lower fabric 11 of the particular fabric layer 16.

Figure 7:
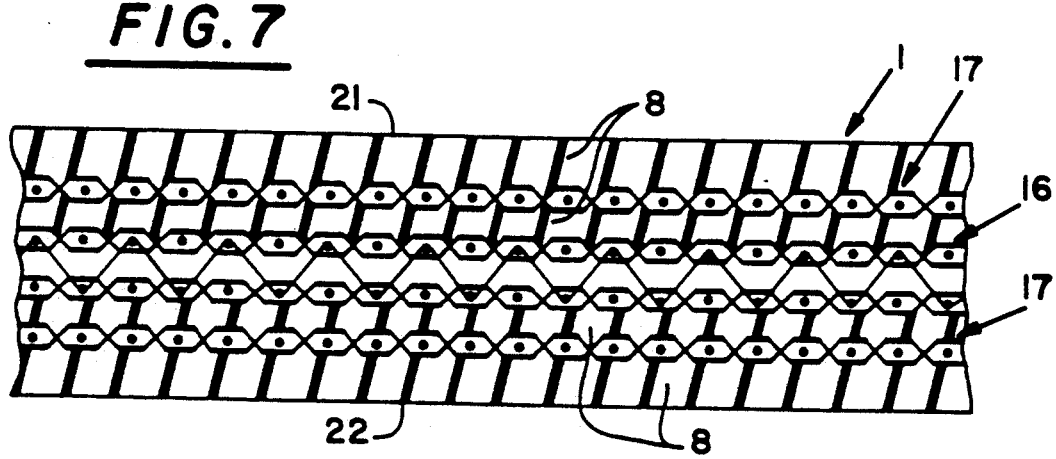
FIG. 7 shows in part a longitudinal section of a seventh embodiment of the transport belt.

FIG. 7 finally shows a seventh embodiment of transport belt 1 having a reinforcing layer in the form of a fabric layer 16 (as per FIG. 6) and two fabric webs 17 formed from a flat fabric which enclose the fabric layer 16 in the manner of a sandwich. The fabric webs 17 are conventional flat fabrics for transport belts. Such a sandwich-like embedding of reinforcing layer in the form of a double pile cloth can also be effected with a fabric layer 9 as described in FIG. 1.

In all the above-described embodiments, the reinforcing layers in the form of double pile cloth layers extend in the longitudinal direction of the transport belt 1 and essentially across the width of transport belt 1.

Furthermore, the above-described reinforcing layer in the form of a double pile cloth layer 9, 15 or 16 makes it possible to vary the manner of interlacing of warp 13 and weft 14 in the fabric with one another in a suitable manner. Besides a plain weave it is also possible to use weaves with floating threads, for example panama, satin/sateen or twill. In particular, to allow a high number of wefts to be incorporated to meet the transverse stiffness requirement, a weave with floating threads is preferred.

Since numerous embodiments of the invention are possible without departure from the basic concept, it will be readily understood that the embodiments described are merely illustrative and not intended to restrict the scope of the invention.

We claim:

1. Transport belt comprised of a fabric-reinforced plastic sheet material having a textile reinforcing layer which extends in the longitudinal direction and is formed from interlaced warp and weft threads, wherein the reinforcing layer is formed by a strength component in the form of a double pile cloth (9, 15 16) having an upper and a lower fabric (10, 11) which are bound together by low, weft-binding pile threads (12), having a length between binding points in the range of 0.1 to 2 mm, in such a way as to form a tension-resistant unit of upper and lower fabric (10, 11), wherein the pile threads (12), in the event of a bending stress on the transport belt, permit a small degree of recoverable flexibility between the upper and the lower fabric (10, 11) in the warp direction.

2. Transport belt according to claim 1, characterized in that upper and lower fabrics (10, 11) are bound together one on top of the other without a space in between.

3. Transport belt according to any one of claim 1, characterized in that the warp threads (13) are comprised of multifilament yarns and the weft threads (14) of monofilament yarns.

4. Transport belt according to claim 1 characterized in that upper and lower fabrics (10, 11) are comprised of plain-woven warp and weft threads (13, 14) and the pile threads (12) are laid in by weft pile on- or through-binding.

5. Transport belt according to claim 1 characterized in that pile threads (12) which are arranged adjacent to one another in the weft direction are in a staggered arrangement.

6. Transport belt according to claim 1 characterized in that the double pile cloths (9, 15 16) are comprised of synthetic fibers or fiber blends.

7. Transport belt according to claim 1 characterized in that the transport belt includes a backing side having an outer surface that include an outwardly directed pile surface.

8. Transport belt according to claim 7, characterized in that the pile surface exhibits tufts of conductive yarns.

9. Transport belt according to claim 1 characterized in that yarns having a weight of from 10 to 600 tex, preferably from 100 to 180 tex, are used.

10. Transport belt according to claims 1 characterized in that a plurality of mutually spaced-apart double pile cloths (9, 15, 16) are provided.

11. Transport belt according to claim 1 characterized in that there are provided additional flat fabric layers (17) which extend in the longitudinal direction and which embed the double pile cloth (9, 15, 16) in sandwich fashion.

12. A transport belt according to claim 7 wherein the pile surface comprises a velour fabric.

* * * * *